(12) United States Patent
Müller et al.

(10) Patent No.: US 7,047,647 B1
(45) Date of Patent: May 23, 2006

(54) HAND-HELD POWER TOOL WITH A SUCTION DEVICE

(75) Inventors: Stephan Müller, Nellmersbach (DE); Konstantin Baxivanelis, Kaufering (DE); Michael Neumeier, Steingaden (DE)

(73) Assignee: Hilti Aktiengesellschaft, Schaan (LI)

( * ) Notice: Subject to any disclaimer, the term of this patent is extended or adjusted under 35 U.S.C. 154(b) by 427 days.

(21) Appl. No.: 10/284,221

(22) Filed: Oct. 30, 2002

(30) Foreign Application Priority Data

Nov. 6, 2001 (DE) .................................. 101 53 939

(51) Int. Cl.
*B26B 7/00* (2006.01)
(52) U.S. Cl. .......................................... 30/124; 30/392
(58) Field of Classification Search ................ 30/123, 30/124, 133, 392, 391
See application file for complete search history.

(56) References Cited

U.S. PATENT DOCUMENTS

| | | | | |
|---|---|---|---|---|
| 1,876,337 A | * | 9/1932 | Mead ........................... | 30/124 |
| 3,103,069 A | * | 9/1963 | James ........................... | 30/124 |
| 3,481,036 A | * | 12/1969 | Slaughter ...................... | 30/124 |
| 4,192,390 A | * | 3/1980 | Wanner et al. ................. | 173/75 |
| 4,281,457 A | * | 8/1981 | Walton, II ..................... | 30/124 |
| 4,841,929 A | * | 6/1989 | Tuggle et al. ............ | 123/198 E |
| 5,074,044 A | * | 12/1991 | Duncan et al. ................ | 30/124 |
| 5,392,492 A | * | 2/1995 | Fassauer ..................... | 15/327.3 |
| 5,467,835 A | * | 11/1995 | Obermeier et al. .......... | 175/209 |
| 5,862,595 A | * | 1/1999 | Keane ........................... | 30/124 |
| 5,878,607 A | * | 3/1999 | Nunes et al. .................. | 30/124 |
| 6,514,131 B1 | * | 2/2003 | Reich et al. ................. | 451/344 |

* cited by examiner

Primary Examiner—Hwei-Siu C. Payer
(74) Attorney, Agent, or Firm—Abelman, Frayne & Schwab

(57) ABSTRACT

A hand-held power tool inclLldes motor-driven drive shaft (4) for driving a working tool (9) and located in the tool housing (1), and a suction device (2) formed as a modular unit releasably connectable wYith the tool housing (1) and having a suction conduit (5), a receiving chamber (7), a precipitation device (8) located in the receiving chamber (7), and an impeller (6) driven by the drive shaft (4) of the power tool and located between the suction conduit (5) and the precipitation device (8).

8 Claims, 3 Drawing Sheets ically produced. In addition, the inventive suction device can be easily attached to different hand-held tools, such as, e.g., as compass saws, circular saws and the like. Thereby, an economical solution is provided for a user who operates with several power tools because very little additional storage space is needed.

HAND-HELD POWER TOOL WITH A SUCTION DEVICE

BACKGROUND OF THE INVENTION

1. Field of the Invention

The present invention relates to a hand-held power tool having a housing, a motor-driven drive shaft for driving a working tool and located in the housing, and a suction device formed as a modular unit and releasably connectable with the power tool housing, with the suction device having a suction conduit, a receiving chamber, a precipitation device located in the receiving chamber, and an impeller driven by the drive shaft of the power tool.

2. Description of the Prior Art

Hand-held power tools of the type described above are used for cutting concrete, wood and the like. During cutting, particles, e.g., dust, cause a significant contamination of the work environment. In particular, during working in living spaces or in areas where food is stored or electronic means is stored or produced, contamination is undesirable and even not allowed. For this reason, the particles or dust should be removed. To this end, there are provided suction devices which can be located externally of the power tools or form their integral part. European Publication EP 470 046 A1 discloses a hand-held power tool with a suction device that forms an integral part of the power tool. The suction device includes a suction conduit, an impeller driven by the drive shaft of the power tool, and precipitation device located between the suction conduit and the impeller. The impeller creates vacuum in the precipitation device which provides for movement of the particles or dust from the suction device and into the precipitation device. The precipitation device has, at least partially, areas which are air-permeable but prevent the particles from leaving the precipitation device.

The arrangement of the precipitation device between the suction conduit and the impeller results in increased dimensions of the suction device which makes the integration of the suction device into the power tool more difficult.

Accordingly, an object of the present invention is to provide a suction device for a hand-held power tool and which can be economically produced, be compact, and can be easily handled.

Another object of the present invention is to provide a suction device releasably connectable with a hand-held power tool.

SUMMARY OF THE INVENTION

These and other objects of the present invention, which will become apparent hereinafter, are archived by providing a suction device in which the impeller is arranged between the suction conduit and the precipitation device.

By arranging, according to the present invention, the impeller between the suction conduit and the precipitation device, it became possible to form the suction device as a modular unit with a very compact outer profile.

The user of a power tool can easily connect the two units, the power tool and the suction device, with each other, as the user can easily grasp the compact suction device with one hand and to attach it to the power tool. In addition, the inventive suction device can be easily attached to different hand-held tools, such as, e.g., as compass saws, circular saws and the like. Thereby, an economical solution is provided for a user who operates with several power tools because very little additional storage space is needed.

Preferably, the impeller extends, at least partially into the receiving chamber, which permits to eliminate an additional connection between the impeller and the precipitation device. In addition, the so arranged impeller permits to obtain a particularly compact suction device and to reduce power losses which otherwise would have been incurred as a result of elongate connection conduits between the impeller and the precipitation device.

Advantageously, the impeller is provided with radially extending vanes which, on one hand, permits to obtain an optimal effect and, on the other hand, a particularly compact size of the impeller and, thereby, of the suction device.

Advantageously, the suction conduit has a feeding opening that is located substantially centrally with respect to the impeller. This permits to obtain a maximal suction output.

The receiving chamber advantageously has a cylindrical, preferably sleeve-like shape, which permits to provide a large surface for separation of particles. If necessary, the surface can include a separating filter which forms a part of the surface. In addition, cleaning of a cylindrical receiving chamber from precipitated particles can be done more easily than of a chamber with corners and edges.

Advantageously, the impeller is arranged coaxially with respect to the receiving chamber which insures a compact arrangement, which further reduces the dimensions of the suction device.

The novel features of the present invention, which are considered as characteristic for the invention, are set forth in the appended claims. The invention itself, however, both as to is construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
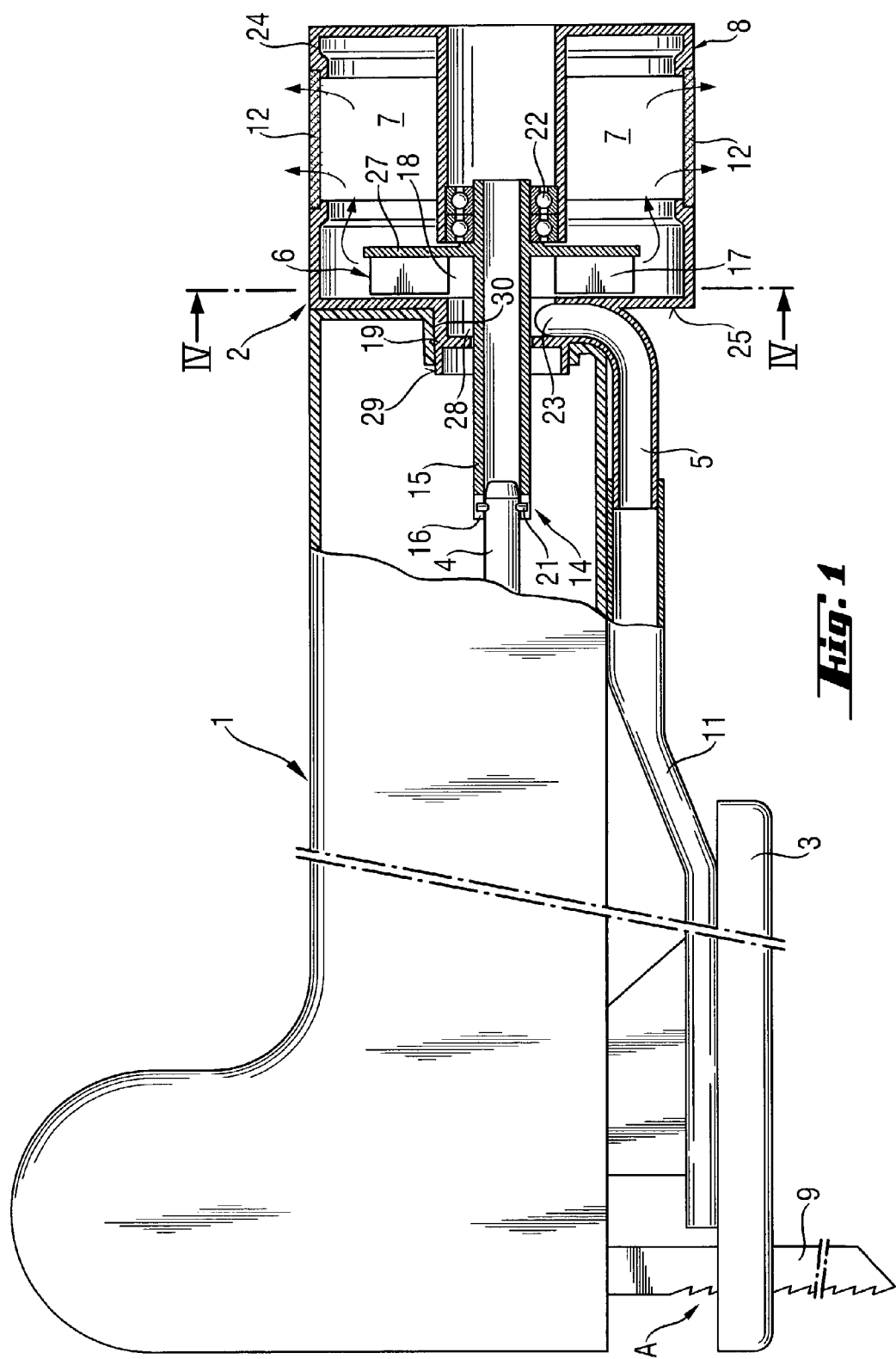
FIG. 1 a longitudinal partially cross-sectional view of a hand-held power tool formed as compass saw with a suction device according to the present invention.
Figure 2:
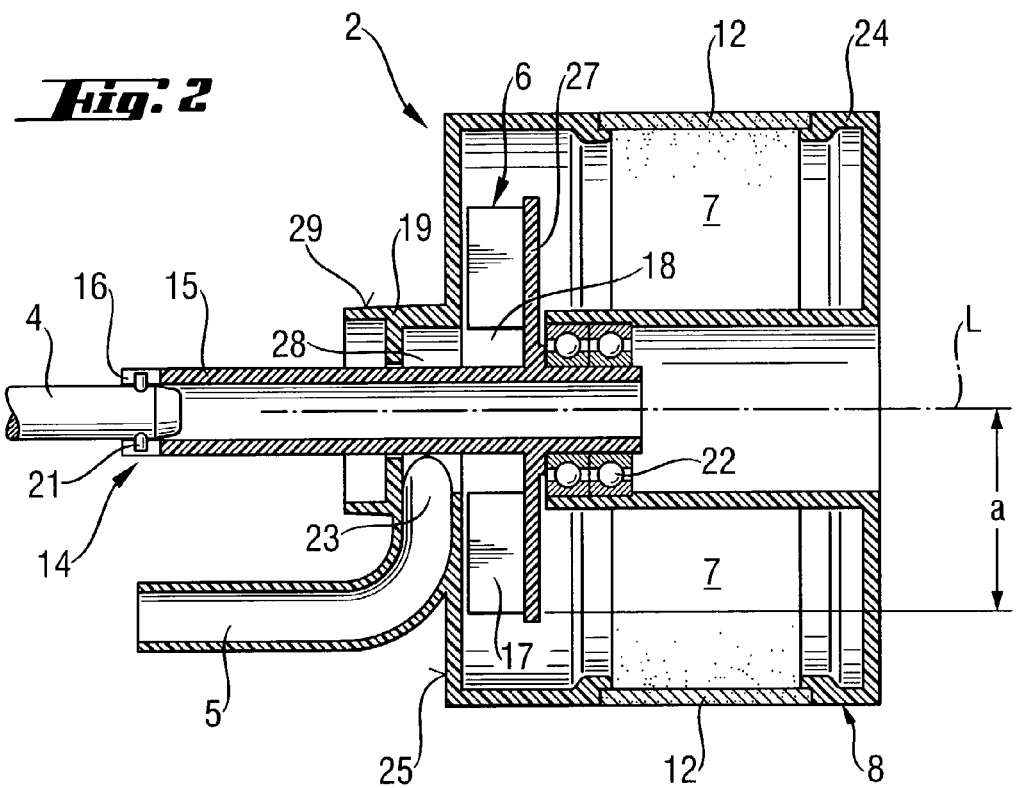
FIG. 2 a cross-sectional view of the suction device shown in FIG. 1 with a connected drive shaft which is shown only partially.
Figure 3:
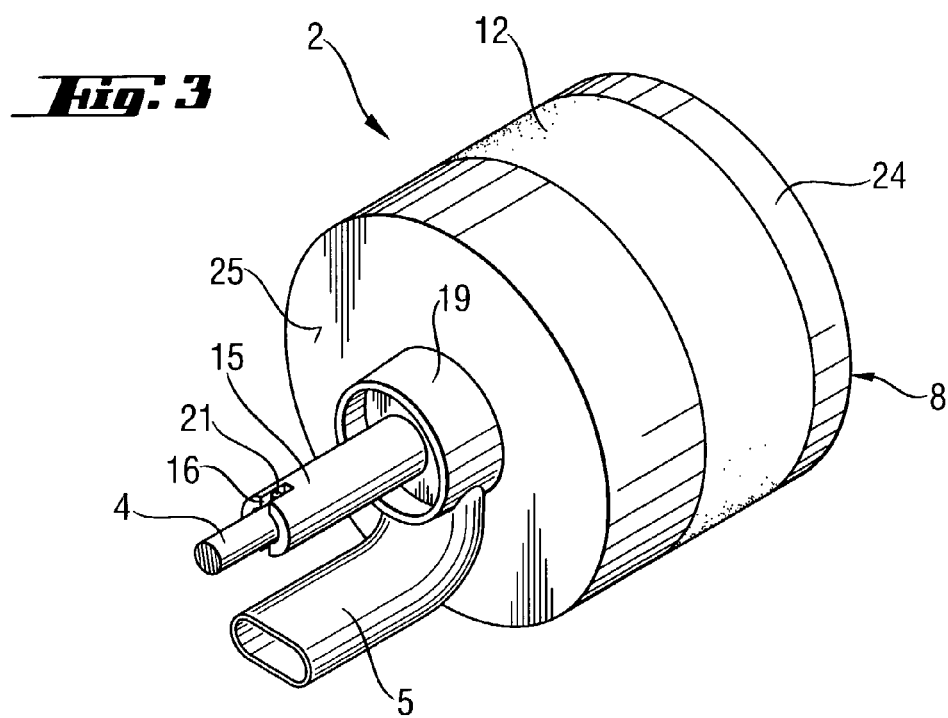
FIG. 3 a perspective view of a suction device according to the present invention.
Figure 4:
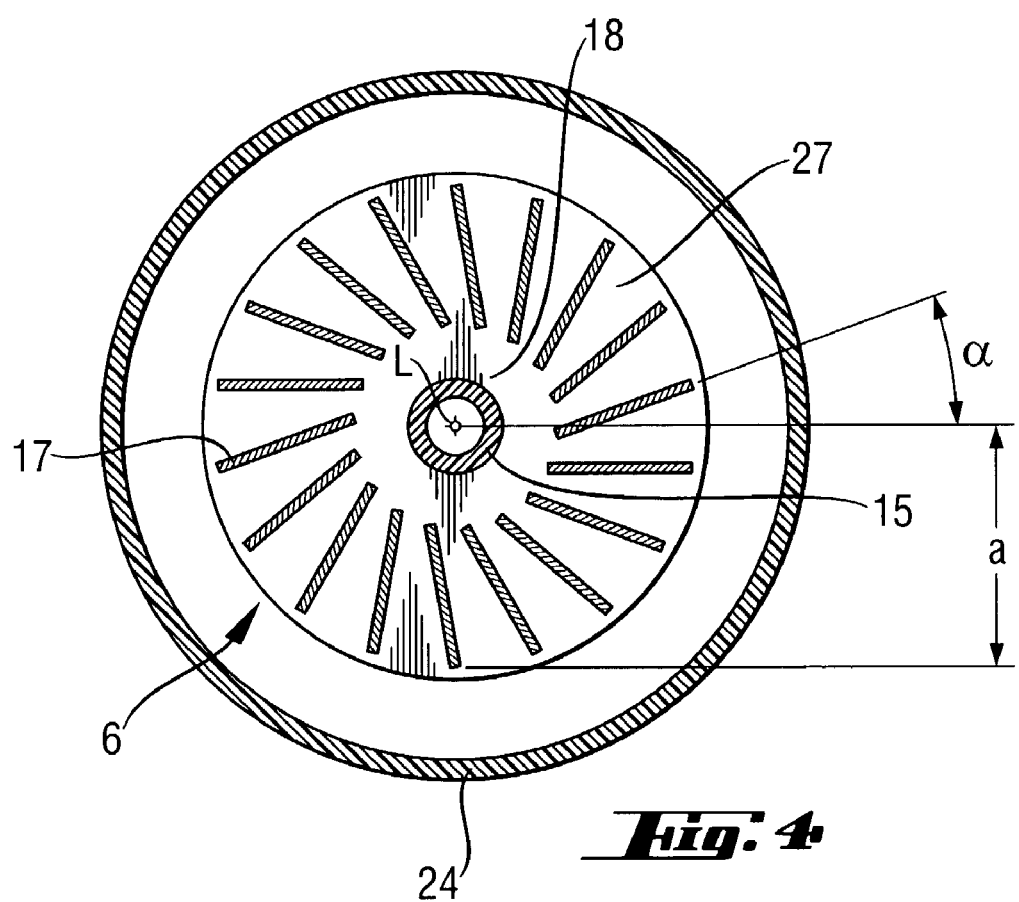
FIG. 4 a cross-sectional view along line IV—IV in FIG. 1.

A hand-held power tool shown in FIGS. 1–4, which includes a suction device according to the present invention and which is formed, e.g., as a compass saw, has a motor-driven drive shaft 4 for a working tool 9 and includes a suction device 2 releasably connectable with the power tool housing 1 and formed as a separate modular unit. The power tool or compass saw has a support plate 3 connectable with the housing 1 for guiding the power tool along a working piece (not shown). Between the support plate 3 and the housing 1, there is provided a suction conduit 11 for removing separated, by the working tool 9, material, in particular dust, from a cutting region A of the working tool 9.

The suction device 2 has a suction conduit 5 connected with the suction conduit 11 and through which the removable material is conducted into the suction device 2. The suction conduit 5 has a feeding opening 23 arranged centrally with respect to an impeller 6. The suction device 2 further includes a precipitation device 8. The precipitation device 8 has a housing 24 with a sleeve-shaped outer profile. A circular end side 25 is connected with the housing 1 of the power tool in the region of the drive shaft 4 with snap means (not shown). In the housing 24, a receiving chamber 7 is formed. The impeller 6 is driven the power tool drive shaft 4. The impeller 6 is secured on the drive shaft 4 for the joint rotation therewith by a releasable coupling 14. The rotational movement of the drive shaft 4 provides for a pendulum-like movement of the working tool 9, as is conventional in compass saws, and for rotational movement of the impeller 6, the rotation of which creates a vacuum in the suction conduit 5 and an overpressure in the receiving chamber 7. As a result of rotation of the impeller 6, the removed material or particles, in particular dust, is aspirated from the cutting region A of the working tool 9 through the suction conduit 11 and is blown in to the receiving chamber 7.

The precipitation device 8 is provided, on its outer surface, with a separating filter 12 which forms a part thereof. The filter 12 is air-permeable but is not permeable for particles or dust. The overpressure, which is created in the receiving chamber 7, forces the air therein through the separating filter 12 into the environment. However, the particles or dust remain in the receiving chamber 7 because of the dust impermeability of the filter 12.

The impeller 6 has a support sleeve-shaped shaft 15 provided, at one of its ends, with a coupling part of the coupling 14 formed as an elongate slot 16. In addition, the impeller 6 includes an impeller disc 27 and secured on the disc 27, radially extending vanes 17 which are inclined at an angle α and which extend up to a distance a with respect to the longitudinal axis L of the impeller 6, as particularly shown in FIGS. 2 and 4. Between the vanes 17, which are fixedly secured on the impeller disc 27 and the outer surface of the support shaft 15, there is provided an annular receiving region 18 that is connected with the suction conduit 5 by a feed channel 28. The receiving region 18 opens toward the vanes 17, as particularly shown in FIG. 2.

In order to insure an automatic centering of the suction device 2 with respect to the housing 1 of the power tool and, in particular, with respect to the drive shaft 4, the suction device 2 is provided with a sleeve-shaped centering member 19 coaxial with the support shaft 15 of the impeller 6. The centering member 19 extends in the direction of the coupling part of the coupling 14 associated with the impeller 6. Preferably, the centering member 19 has an outer profile 29 tapering toward the free end of the centering member 19. The outer tapering profile 29 facilitate the insertion of the centering member 19 into a complementary opening 30 provided in the power tool housing 1 coaxially with the drive shaft 4.

In the connected condition of the suction device 2, a cam 21, which is provided on the drive shaft 4, engages in the elongate slot 16 of the support shaft 15 of the impeller 6. The support shaft 15 is rotatably supported in a bearing 22 arranged in the precipitation device 8.

The precipitation device 8 can, e.g., be lifted, at least partially, from the otherwise conventional suction device, which facilitate cleaning of both the suction device 2 and the precipitation device 8.

Though the present invention was shown and described with references to the preferred embodiment, such is merely illustrative of the present invention and are not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held power tool, comprising a housing (1); a motor-drive shaft (4) for driving a working tool (9) and located in the housing (1); and a suction device (2) formed as a modular unit releasably connectable with the power tool housing (1), the suction device (2) having a housing (24); a suction conduit (5), a receiving chamber (7) formed in the suction device housing, precipitation means (12) located in the receiving chamber (7), and an impeller driven by the motor-drive shaft (4) of the power tool, located between the suction conduit (5) and the precipitation means (12), and extending, at least partially, into the receiving chamber (7); a support shaft (15) for supporting the impeller, connectable with the motor-drive shaft of the power tool, and extending into the suction device housing (24); and bearing means (22) located in the suction device housing (24) for supporting the support shaft.

2. A hand-held power tool according to claim 1, wherein the impeller (6) includes radially extending vanes (17).

3. A hand-held power tool according to claim 1, wherein the suction conduit (5) has a feeding opening (23) arranged substantially centrally with respect to the impeller (6).

4. A hand-held power tool according to claim 1, wherein the receiving chamber (7) has a cylindrical shape.

5. A hand-held power tool according to claim 4, wherein the impeller (6) is arranged coaxially with the receiving chamber (7).

6. A hand-held power tool according to claim 1, wherein the precipitation means (12) form part of the receiving chamber (7).

7. A suction device for a hand-held power tool having a housing and a motor-driven shaft for driving a working tool and located in the housing, the suction device comprising a housing (24); a suction conduit (5); a receiving chamber (7) formed in the suction device housing (24); precipitation means (12) located in the receiving chamber (7); an impeller (6) driven by the motor-drive shaft (4) of the power tool located between the suction conduit (5) and the precipitation means (12), and extending, at least partially, into the receiving chamber (7); a support shaft (15) for supporting the impeller, connectable with the motor-drive shaft of the power tool, and extending into the suction device housing (24); and bearing means (22) located in the suction device housing (24) for supporting the support shaft (15).

8. A suction device according to claim 7, wherein the precipitation means (12) form part of the receiving chamber (7).

* * * * *